(12) United States Patent
Pocha Siva Sankara et al.

(10) Patent No.: US 10,508,595 B2
(45) Date of Patent: Dec. 17, 2019

(54) ENGINE RECOVERY SYSTEM FOR ENGINE SYSTEM

(71) Applicant: Progress Rail Locomotive Inc., LaGrange, IL (US)

(72) Inventors: Reddy Pocha Siva Sankara, Naperville, IL (US); Sudarshan Loya, Naperville, IL (US); Keith Moravec, Downers Grove, IL (US); Michael B. Goetzke, Orland Park, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 198 days.

(21) Appl. No.: 15/653,691

(22) Filed: Jul. 19, 2017

(65) Prior Publication Data

US 2019/0024585 A1 Jan. 24, 2019

(51) Int. Cl.
| | |
|---|---|
| *F02C 6/12* | (2006.01) |
| *F02B 37/00* | (2006.01) |
| *F02B 37/16* | (2006.01) |
| *F02B 37/18* | (2006.01) |
| *F02M 26/05* | (2016.01) |
| *F02M 26/08* | (2016.01) |
| *F02M 26/10* | (2016.01) |

(52) U.S. Cl.
CPC ............. *F02C 6/12* (2013.01); *F02B 37/004* (2013.01); *F02B 37/166* (2013.01); *F02B 37/186* (2013.01); *F02M 26/05* (2016.02); *F02M 26/08* (2016.02); *F02M 26/10* (2016.02)

(58) Field of Classification Search
CPC ...... F02B 37/001; F02B 37/007; F02B 37/18; F02B 37/183; F02B 37/186

USPC .... 60/598, 602, 605.1, 612; 123/528, 559.1, 123/562
See application file for complete search history.

(56) References Cited

U.S. PATENT DOCUMENTS

2007/0144155 A1* 6/2007 Moncelle .............. B60T 17/002
                                                              60/289
2014/0230799 A1* 8/2014 Parikh .................. F02B 37/013
                                                              123/568.11
2016/0303946 A1 10/2016 Miller et al.

FOREIGN PATENT DOCUMENTS

DE        10239110 A1 * 3/2004 ............. F02B 21/00
DE       102011108194    1/2013
DE       102013001662    7/2014
(Continued)

*Primary Examiner* — Mark A Laurenzi
*Assistant Examiner* — Mickey H France

(57) ABSTRACT

An energy recovery system for an engine system is disclosed. The engine system includes an engine, an exhaust conduit configured to receive exhaust gases discharged from the engine, and a first turbocharger coupled to the exhaust conduit to receive exhaust gases from the engine and provides compressed air to the engine. The energy recovery system includes a bypass conduit, a second turbocharger, and an accumulator. The bypass conduit is coupled to the exhaust conduit upstream of the first turbocharger, and facilitates a portion of exhaust gases from the exhaust conduit to bypass the first turbocharger. The second turbocharger is coupled to the bypass conduit, and is driven by the portion of exhaust gases bypassing the first turbocharger to compress air received from an ambient to a first pressure. The accumulator is in fluid communication with the second turbocharger, and stores air received from the second turbocharger at the first pressure.

20 Claims, 2 Drawing Sheets

(56) References Cited

FOREIGN PATENT DOCUMENTS

FR 2875267 3/2006

* cited by examiner

ENGINE RECOVERY SYSTEM FOR ENGINE SYSTEM

TECHNICAL FIELD

The present disclosure relates to an engine system. More particularly, the present disclosure relates to an energy recovery system for the engine system.

BACKGROUND

Internal combustion engines such as diesel engines generally include turbochargers to utilize energy of exhaust gases to provide compressed air to the engine to boost engine power and efficiency. Turbochargers are generally designed or selected for use with the engine to meet demands at the lower and mid speed and power ranges of the engine. However, when the engines are operated at the rated and near rated conditions, substantial amount of exhaust gases may be bypassed from the turbochargers and discharged to the atmosphere. This leads to wastage of exhaust energy and impact fuel economy of the engines.

DE Patent No. 102011108194 relates to an engine system having a first turbocharger to provide compressed air to an engine. The engine system also includes an additional turbine driven by exhaust gases bypassed from the first turbocharger. The additional turbine drives a generator to produce electricity which is then either used for operating one or electrical loads or stored in a battery.

SUMMARY OF THE INVENTION

In one aspect, the disclosure relates to an energy recovery system for an engine system. The engine system includes an engine, an exhaust conduit configured to receive exhaust gases discharged from the engine, and a first turbocharger coupled to the exhaust conduit to receive exhaust gases from the engine. The first turbocharger is configured to provide compressed air to the engine. The energy recovery system includes a bypass conduit, a second turbocharger, and an accumulator. The bypass conduit is coupled to the exhaust conduit upstream of the first turbocharger. The bypass conduit facilitates a portion of exhaust gases from the exhaust conduit to bypass the first turbocharger. The second turbocharger is coupled to the bypass conduit, and is driven by the portion of exhaust gases bypassing the first turbocharger. The second turbocharger compresses air received from an ambient to a first pressure. The accumulator is in fluid communication with the second turbocharger and is configured to store air received from the second turbocharger at the first pressure.

In another aspect, the disclosure relates to an engine system including an engine, an exhaust conduit, a first turbocharger, a bypass conduit, a second turbocharger, and an accumulator. The exhaust conduit is configured to receive exhaust gases discharged from the engine. The first turbocharger is coupled to the exhaust conduit to receive exhaust gases from the engine, and is configured to provide compressed air to the engine. The bypass conduit is coupled to the exhaust conduit upstream of the turbocharger. The bypass conduit facilitates a portion of exhaust gases from the exhaust conduit to bypass the first turbocharger. The second turbocharger is coupled to the bypass conduit. The second turbocharger is driven by the portion of exhaust gases bypassing the first turbocharger to compress air received from an ambient to a first pressure. The accumulator is in fluid communication with the second turbocharger, and is configured to store air received from the second turbocharger at the first pressure.

In yet another aspect, the disclosure relates to a locomotive. The locomotive includes an engine, an exhaust conduit, a first turbocharger, a bypass conduit, a second turbocharger, and an accumulator. The exhaust conduit is configured to receive exhaust gases discharged from the engine. The first turbocharger is coupled to the exhaust conduit to receive exhaust gases from the engine, and is configured to provide compressed air to the engine. The bypass conduit is coupled to the exhaust conduit upstream of the first turbocharger. The bypass conduit facilitates a portion of exhaust gases from the exhaust conduit to bypass the first turbocharger. The second turbocharger is coupled to the bypass conduit. The second turbocharger is driven by the portion of exhaust gases bypassing the first turbocharger to compress air received from an ambient to a first pressure. The accumulator is in fluid communication with the second turbocharger, and is configured to store air received from the second turbocharger at the first pressure. The locomotive further includes an auxiliary compressor and an air reservoir. The auxiliary compressor is fluidly coupled to the accumulator, and is configured to compress air received from the accumulator to a second pressure. The air reservoir is configured to store the air received from the auxiliary compressor at the second pressure.

DETAILED DESCRIPTION

Figure 1:
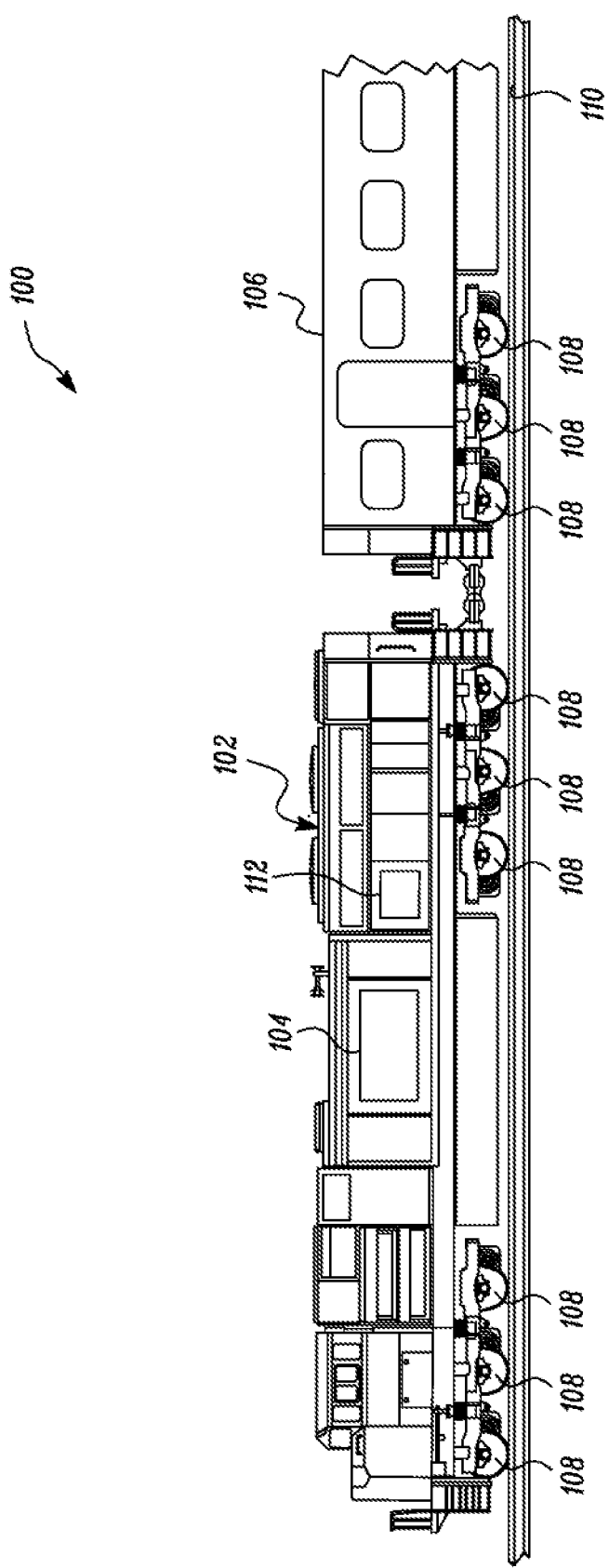
FIG. 1 illustrates a locomotive having an engine system of the locomotive, in accordance with all embodiment of the present disclosure.

Referring to FIG. 1, a machine 100 is disclosed. The machine 100 may be a locomotive system. The machine 100 includes a locomotive 102 with an engine system 104 mounted in the locomotive 102. The machine 100 also includes one or more rail cars 106 (only one shown in FIG. 1) that are coupled with the locomotive 102. The rail cars 106 may be arranged sequentially and coupled with the locomotive 102. In an embodiment, the machine 100 includes a single engine system 104, although it is possible to have multiple engine systems connected to each other to facilitate machine movement. The engine system 104 is configured to generate power needed to operate, for example propel, the machine 100.

A number of wheels 108 are positioned throughout a length of the machine 100 in a known manner. The wheels 108 engage tracks 110 of the railroad, supporting and facilitating traversal of the machine 100 over the railroad. Further, the machine 100 includes a brake system 112 that is configured to apply brakes on the wheels 108 to reduce a velocity or stop the machine 100. The brake system 112 may be an air powered system that utilizes pressurized air to apply brakes to the machine 100 or locomotive 102. Although aspects of the present disclosure are applicable to a locomotive system, aspects of the present disclosure are applicable to various other machines and environments.

Figure 2:
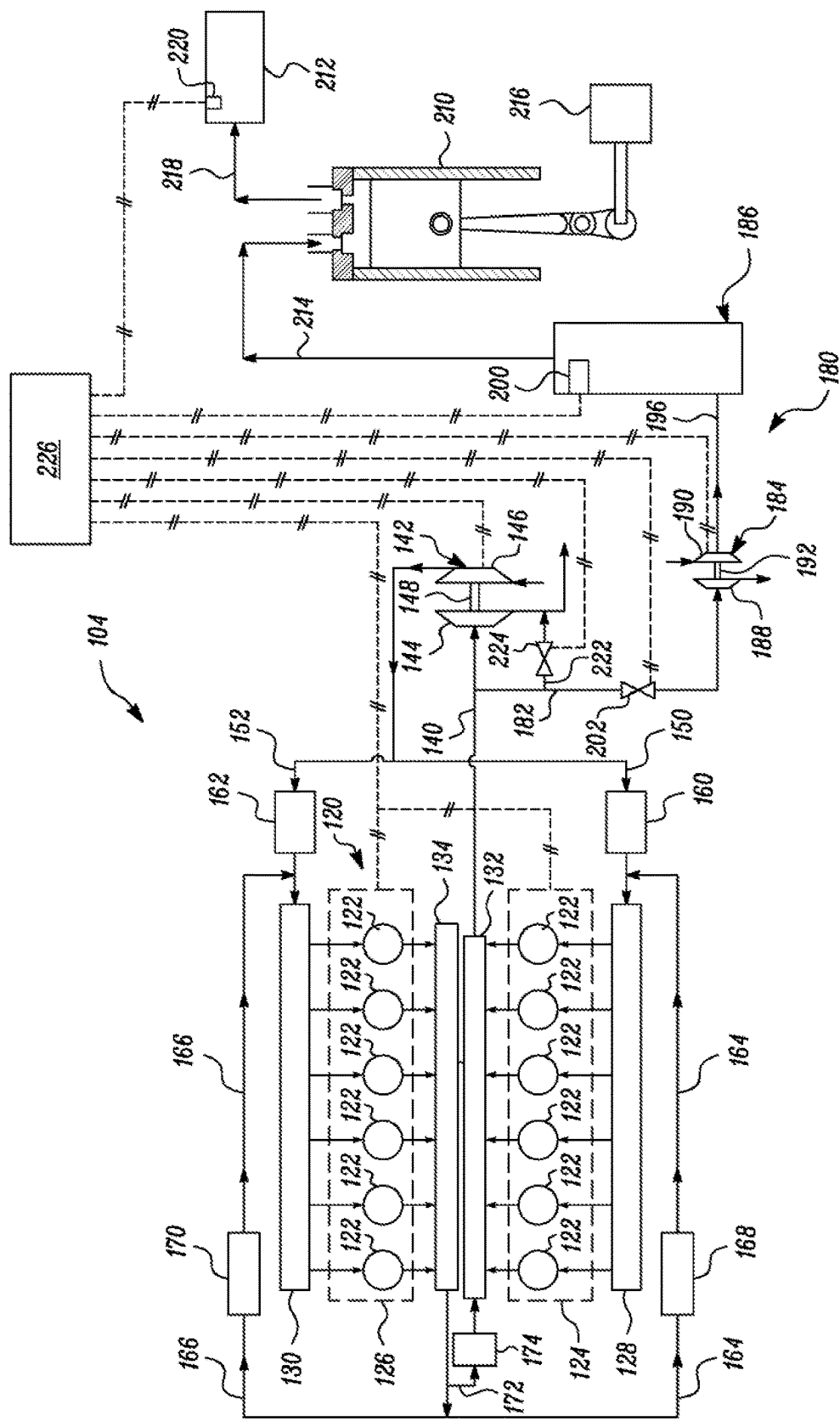
FIG. 2 illustrates a schematic view of the engine system having an energy recovery system, in accordance with an embodiment of the present disclosure.

The engine system 104 represents one of the commonly applied power generation units in locomotive systems. Referring to FIG. 2, the engine system 104 includes an engine 120, such as an internal combustion engine having a plurality of cylinders 122. The engine 120 may be a diesel engine, a dual-fueled engine, a spark ignited engine, a gasoline engine, a gaseous engine etc. The engine 120 may embody a V-type, an in-line, or a varied configuration as is conventionally known. As shown in FIG. 2, the engine 120 is a multi-cylinder engine (12 cylinders are shown), although aspects of the present disclosure are applicable to engines with a single cylinder as well. Further, the engine 120 may be one of a two-stroke engine, a four-stroke engine, or a six-stroke engine. Although these configurations are disclosed, aspects of the present disclosure need not be limited to any particular engine type.

The cylinders 122 of the engine 120 may be disposed in a multiple bank configuration, for example a first bank 124 and a second bank 126 in each of which the cylinders 122 are mounted. Although, the engine 120 with multiple banks are contemplated, it may be appreciated that an engine with single bank may also be applicable. The engine 120 may include, a first intake manifold 128 and a second intake manifold 130, which are respectively connected with the first bank 124 and the second bank 126 to provide air to the cylinders 122 for combustion. In particular, the cylinders 122 of the first bank 124 may receive air from the first intake manifold 128, while cylinders 122 of the second bank 126 may separately receive air from the second intake manifold 130. The engine 120 also includes a first exhaust manifold 132 and a second exhaust manifold 134, which are respectively connected with the first bank 124 and the second bank 126 to receive exhaust gases discharged by the cylinders 122. In particular, the cylinders 122 of the first bank 124 may discharge exhaust gases into the first exhaust manifold 132, while the cylinders 122 of the second bank 126 may separately discharge exhaust gases into the second exhaust manifold 134.

The engine system 104 further includes an exhaust conduit 140 configured to receive exhaust gases discharged by the engine 120, and a first turbocharger 142 coupled to the exhaust conduit 140 to receive the exhaust gases from the engine 120. In an implementation, the exhaust gases from the first exhaust manifold 132 may flow through the exhaust conduit 140 that couples the first exhaust manifold 132 to the first turbocharger 142. Thereby, the exhaust conduit 140 fluidly couples the engine 120 to the first turbocharger 142. The first turbocharger 142 includes a first turbine 144 that is driven by the exhaust gases received from the exhaust conduit 140 to rotate a first compressor 146 to compress an air received from an ambient. The first turbine 144 may be coupled to the first compressor 146 via a shaft 148. Thereby, the first turbocharger 142 is coupled to the exhaust conduit 140 to receive exhaust gases discharged by the engine 120 and provides compressed air to the engine 120. The air compressed and discharged by the first compressor 146 may be directed to the first intake manifold 128 and the second intake manifold 130 via a first conduit 150 and a second conduit 152 respectively. Further, it may be appreciated that engine system 104 may also include an additional turbocharger arranged in series relative to the first turbocharger 142. In such a case, the additional turbocharger further compresses the compressed air received from the first turbocharger 142 before directing the compressed air to the engine 120. The additional turbocharger is driven by the exhausts gases discharged by the first turbocharger 142. The engine system 104 may also include one or more after-cooler, for example a first after-cooler 160 and a second after-cooler 162 to cool the air after compression from the first compressor 146 and before delivering the air to the engine 120. As shown, the first after-cooler 160 may be arranged to cool the air being delivered to the first intake manifold 128, while the second after-cooler 162 may be arranged to cool the air being delivered to the second intake manifold 134.

In an embodiment, the exhaust gases from the second exhaust manifold 134 may be directed to the first turbocharger 142 via the exhaust conduit 140. In such a case, in an embodiment, the exhaust gases from the second exhaust manifold 134 enters the first exhaust manifold 132 before passing through the exhaust conduit 140. Alternatively, the second exhaust manifold 134 may be directly connected to the exhaust conduit 140. In certain implementations, exhaust gases from the second exhaust manifold 134 may not be directed through the first turbocharger 142. Instead, exhaust gases, at least a portion, may be directed to both the first intake manifold 128 and the second intake manifold 130 through one or more passages, for example first passage 164 and second passage 166 respectively Therefore, a portion of exhaust gases released by the engine 120 is directed back to the engine 120. The exhaust gases may pass through one or more cooler, for example a first cooler 168 and a second cooler 170 and/or one or more filters (not shown), before mixing with pressurized air downstream of the first compressor 146. Further, one at more valves may control an amount of exhaust gases mixed with the air. In this manner, exhaust gases from only cylinders 122 of the second bank 126 may be recirculated and distributed evenly to all cylinders 122 for subsequent combustion during the next engine cycle. Accordingly, cylinders 122 of the second bank 126 be known as donor cylinders (i.e., on that donate exhaust gas for recirculation), whereas cylinders 122 of the first bank 124 may be known as non-donor cylinders.

In some embodiments, a bypass passage 172 may be provided to selectively allow exhaust gases from the second exhaust manifold 134 to join with exhaust gases from first exhaust manifold 132, thereby helping to balance pressures within the exhaust manifolds 132, 134. An exhaust control valve 174 and/or restricted orifice (not shown) may be placed within bypass passage 172 to regulate the rate of exhaust gases flow from the second exhaust manifold 134 into the first exhaust manifold 132, if desired.

Again referring to FIG. 2, the engine system 104 further include an energy recovery system 180 for recovering energy from exhaust gases flowing through the exhaust conduit 140. The energy recovery system 180 includes a bypass conduit 182, a second turbocharger 184, and an accumulator 186. The bypass conduit 182 is coupled to the exhaust conduit 140 to facilitate a portion of exhaust gases flowing into the exhaust conduit 140 to bypass the first turbocharger 142. The bypass conduit 182 is coupled to the exhaust conduit 140 at a location upstream of the first turbocharger 142 and downstream of the first exhaust manifold 132. The bypass conduit 182 is further coupled to the second turbocharger 184 to provide exhaust gases bypassed from the first turbocharger 142 to the second turbocharger 184.

The second turbocharger 184 is driven by the portion of exhaust gases bypassing the first turbocharger 142 to compress an air received from an ambient to a first pressure. For so doing. the second turbocharger 184 may include a second turbine 188 and a second compressor 190 operatively connected to the second turbine 188 by a shaft 192. The second turbine 188 is coupled to the bypass conduit 182, and is driven by the portion of the exhaust gases received via the bypass conduit 182. The second turbine 188 in turn drives the second compressor 190 to compress the air received from the ambient to the first pressure. The second compressor 190 and hence the second turbocharger 184 is coupled to the accumulator 186 via a passage 196. Therefore, the accumulator 186 is in fluid communication with the second turbocharger 184, and receives air compressed by the second compressor 190 via the passage 196. The accumulator 186 stores the air received from the second turbocharger 184 at the first pressure.

Further, the energy recovery system 180 may include a sensor 200 that may be disposed inside the accumulator 186 to measure a pressure of air inside the accumulator 186. Also, in certain implementations, the energy recovery system 180 may include a bypass valve 202 to control an amount of exhaust gases passing through the bypass conduit 182 and directed to the second turbocharger 184. In an embodiment, as shown in FIG. 2, the bypass valve 202 may be disposed in the bypass conduit 182. In certain implementations, the bypass valve 202 may be disposed at a junction of the bypass conduit 182 with the exhaust conduit 140. In such a case, the bypass valve 202 may be a 3-way valve. The bypass valve 202 may be controlled based on one or more engine operating parameters such as an engine load, an engine power, an engine speed etc. Further, the bypass valve 202 may be controlled based on a capacity of the first turbocharger 142, the pressure of air inside the accumulator 186, etc.

The energy recovery system 180 may further include an auxiliary compressor 210, and an air reservoir 212. The auxiliary compressor 210 may be fluidly coupled to the accumulator 186 to receive the air at the first pressure. The auxiliary compressor 210 may be configured to compress the air received from the accumulator 186 to a second pressure higher than the first pressure. In an embodiment, the auxiliary compressor 210 may be in fluid communication with the accumulator 186 via a first air conduit 214. In certain implementations, the auxiliary compressor 210 may be a reciprocating compressor. Alternatively, the auxiliary compressor 210 may be a rotary compressor. In an embodiment, the auxiliary compressor 210 may be driven by a motor 216 that is driven by the engine 120. The motor 216 may be an electric motor, a hydraulic motor, a pneumatic motor. Air, after compression to the second pressure, is discharged by the auxiliary compressor 210, and is directed to the air reservoir 212 via a second air conduit 218.

The air reservoir 212 may be configured to store the air received from the auxiliary compressor 210 at the second pressure. A pressure sensor 220 may be disposed inside the air reservoir 212 to monitor a pressure of air inside the air reservoir 212. An operation of the auxiliary compressor 210 and the bypass valve 202 may be controlled based on the pressure of air inside the air reservoir 212. In an embodiment, the air reservoir 212 may be an accumulator. Further, in certain implementations, the air reservoir 212 may be in fluid communication with the brake system 112 of the locomotive 102 and the rail cars 106. The brake system 112 may be configured to utilize/receive pressurized air received from the air reservoir 212 to apply brakes to the wheels 108 of the locomotive 102 and the rail cars 106, and thereby reduce a speed of the locomotive 102.

Additionally, or optionally, the energy recovery system 180 may further include an outlet conduit 222 coupled to the bypass conduit 182, and a valve 224 that may be disposed in the outlet conduit 222. The valve 224 may be operated to allow a flow of exhaust gases from the bypass conduit 182 to the ambient via the outlet conduit 222. Therefore, the valve 224 may be controlled to allow the exhaust gases flowing into the bypass conduit 182 to bypass the second turbocharger 184, and flow through the outlet conduit 222. In an embodiment, the valve 224 may be actuated to allow a passage of the exhaust gases through the outlet conduit 222 when the pressure of air stored inside the accumulator 186 corresponds to the first pressure and/or the pressure of air inside the air reservoir 212 corresponds to the second pressure. Alternatively, the valve 224 may be actuated to allow a flow of a portion of the exhaust gases entering the bypass conduit 182 to the ambient when the second turbocharger 184 may be operating at full capacity. In an embodiment, the outlet conduit 222 may be coupled to the exhaust conduit 140.

The energy recovery system 180 may further include a controller 226 that may be in electrical communication with the sensor 200, the pressure sensor 220, the engine 120, the first turbocharger 142, the second turbocharger 184, the bypass valve 202, the valve 224, and other components of the engine system 104. In an embodiment, the controller 226 may receive information from the sensor 200 and the pressure sensor 220 about pressure of the air in the accumulator 186, and the pressure of air inside the air reservoir 212 respectively. In an implementation, the controller 226 may receive information about one or more engine parameters such as the engine load, engine power, engine speed, intake manifold pressures etc. from the engine 120. Further, the controller 226 may determine the maximum capacity of the first turbocharger 142 and the maximum capacity of the second turbocharger 184. Furthermore, the controller 226 may receive information about an operating capacity of the first turbocharger 142 and the second turbocharger 184. In certain other implementation, the controller 226 may receive information regarding amount of opening of the bypass valve 202, and the valve 224.

The controller 226 may actuate and control the bypass valve 202 and/or the valve 224 based on the information received from the sensor 200, the pressure sensor 220, engine 120, engine system 104, the first turbocharger 142, the second turbocharger 184 etc. to maintain a pressure of air inside the accumulator 186 and the air reservoir 212 at the first pressure and the second pressure respectively. In an embodiment, the controller 226 may be engine control module (ECM) of the engine system 104. Alternatively, the controller 226 may be an independent controller different than the ECM. In certain other implementations, the controller 226 may be a locomotive controller.

INDUSTRIAL APPLICABILITY

An exemplary operation of the machine 100 is now explained. During operation, engine 120 of the locomotive 102 produces power to propel the machine 100, and also provide power to operate various auxiliary functions of the machine 100. During such operation, the controller 226 may continuously monitor the engine parameters such as the engine load, the engine power, the engine speed etc. Based on the engine parameters, the controller 226 may control a flow of exhaust gases flowing through the bypass conduit 182 to recover energy from exhaust gases. For example, the controller 226 may determine the engine power that engine is producing, and compare the engine power to a predefined threshold. The controller 226 actuates the bypass valve 202 to allow a portion of exhaust gases flowing into the exhaust conduit 140 to enter the bypass conduit 182 when the engine power is higher than the predefine threshold. The controller may control a degree of opening of the bypass valve 202 based on the engine power and the predefined threshold.

In certain implementations, the controller 226 may determine an amount of the exhaust gases required to operate the first turbocharger 142 to fulfill a demand of intake air from the engine 120. In certain scenario, an amount of the exhaust gases discharged by the engine 120 and flowing through the exhaust conduit 140 may exceed the amount of exhaust gases required to operate the first turbocharger 142 to fulfill a demand of the intake air from the engine 120. Alternatively, the controller may determine that the first turbocharger 142 is operating at maximum capacity. In such cases, the controller 226 may actuate the bypass valve 202 to allow a portion of exhaust gases to bypass the first turbocharger 142 and flow to the second turbocharger 184 via the bypass conduit 182.

Exhaust gases diverted from the exhaust conduit 140 to the second turbocharger 184, by actuating the bypass valve 202, drive the second turbine 188, which in turn drives the second compressor 190 to compress the air drawn from the ambient to a first pressure. The air so compressed by the second compressor 190 is stored by the accumulator 186. In this manner, an energy of the exhaust gases is recovered by operating the second turbocharger 184. In an embodiment, the controller 226 may determine the pressure of air inside the accumulator 186 based on a signal received from the sensor 200. In an implementation, the controller 226 may close the bypass valve 202 when the pressure of air inside the accumulator 186 reaches the first pressure. By so doing, the flow of exhaust gases to the second turbocharger 184 is prevented, thereby stopping an operation of the second turbocharger 184.

In an implementation, the controller 226 may initiate an operation of the auxiliary compressor 210 based on the pressure of the air inside the air reservoir 212. The controller 226 may start the auxiliary compressor 210 based on the pressure of air inside the air reservoir 212 falling below the second pressure. The auxiliary compressor 210 receives the air stored in the accumulator 186 at the first pressure, compress the air, and discharge the air at the second pressure. The controller 226 may keep operating the auxiliary compressor 210 till the pressure of air inside the air reservoir 212 reaches the second pressure. In an embodiment, the controller 226 may close the bypass valve 202 when the pressure of air inside the air reservoir 212 reaches the second pressure and the pressure of air inside the accumulator 186 reaches the first pressure. As the auxiliary compressor 210 compresses the air from the first pressure to the second pressure, a relatively less amount of energy is consumed compared to energy consumed for compressing the air received from the ambient to the second pressure. In this manner, the energy recovery system 180 saves and store energy of the exhaust gases which would otherwise be wasted in an absence of the energy recovery system 180.

Further, in certain scenarios, the controller 226 may determine that the pressure of air inside the accumulator 186 is at the first pressure and/or the first turbocharger 142 and/or the second turbocharger 184 may be operating at the respective maximum capacities. The controller 226 may also determine that the engine power or engine speed of the engine 120 is above the predefined threshold value or the amount of exhaust gases flowing through the exhaust conduit 140 is higher than the amount of exhaust gases required to meet the air demand of the engine 120. In such scenarios, the controller 226 may operate and actuate the valve 224 to direct a portion of the exhaust gases to the ambient. The controller 226 may control a degree of opening of the valve 224 based on the engine parameters.

What is claimed is:

1. An energy recovery system for an engine system that includes an engine, an exhaust conduit configured to receive exhaust gases discharged from the engine, and a first turbocharger, the energy recovery system comprising:
    a bypass conduit coupled to the exhaust conduit upstream of the first turbocharger,
        the bypass conduit facilitating a portion of the exhaust gases from the exhaust conduit to bypass the first turbocharger;
    a second turbocharger coupled to the bypass conduit,
        the second turbocharger being driven by the portion of the exhaust gases bypassing the first turbocharger to compress air received from an ambient to a first pressure;
    a bypass valve to control an amount of the portion of the exhaust gases passing through the bypass conduit to the second turbocharger,
        the bypass valve being controlled based on a maximum capacity of the first turbocharger; and
    an accumulator in fluid communication with the second turbocharger and configured to store air received from the second turbocharger at the first pressure.

2. The energy recovery system of claim 1, further including:
    an auxiliary compressor fluidly coupled to the accumulator, and configured to compress air received from the accumulator to a second pressure.

3. The energy recovery system of claim 2, further including:
    an air reservoir configured to store air received from the auxiliary compressor at the second pressure.

4. The energy recovery system of claim 3, wherein the second pressure is higher than the first pressure.

5. The energy recovery system of claim 1, wherein the bypass valve is controlled further based on one or more engine parameters.

6. The energy recovery system of claim 1, wherein the bypass valve is controlled further based on a pressure of air inside the accumulator.

7. An engine system comprising:
    an engine;
    an exhaust conduit configured to receive exhaust gases discharged from the engine;
    a first turbocharger coupled to the exhaust conduit to receive exhaust gases from the engine and configured to provide compressed air to the engine;
    a bypass conduit coupled to the exhaust conduit upstream of the first turbocharger,
        the bypass conduit facilitating a portion of the exhaust gases from the exhaust conduit to bypass the first turbocharger;
    a second turbocharger coupled to the bypass conduit,
        the second turbocharger being driven by the portion of the exhaust gases bypassing the first turbocharger to compress air received from an ambient to a first pressure;
    a bypass valve to control an amount of the portion of the exhaust gases passing through the bypass conduit to the second turbocharger,
        the bypass valve being controlled based on a maximum capacity of the first turbocharger; and
    an accumulator in fluid communication with the second turbocharger and configured to store air received from the second turbocharger at the first pressure.

8. The engine system of claim 7, further including:
an auxiliary compressor fluidly coupled to the accumulator and configured to compress air received from the accumulator to a second pressure.

9. The engine system of claim 8, further including:
an air reservoir configured to store air received from the auxiliary compressor at the second pressure.

10. The engine system of claim 8, wherein the second pressure is higher than the first pressure.

11. The engine system of claim 7, wherein the bypass valve is controlled further based on one or more engine parameters.

12. The engine system of claim 7, wherein the bypass valve is controlled further based on a pressure of air inside the accumulator.

13. A locomotive comprising:
an engine;
an exhaust conduit configured to receive exhaust gases discharged from the engine;
a first turbocharger coupled to the exhaust conduit to receive exhaust gases from the engine and configured to provide compressed air to the engine;
a bypass conduit coupled to the exhaust conduit upstream of the first turbocharger,
the bypass conduit facilitating a portion of the exhaust gases from the exhaust conduit to bypass the first turbocharger;
a second turbocharger coupled to the bypass conduit,
the second turbocharger being driven by the portion of the exhaust gases bypassing the first turbocharger to compress air received from an ambient to a first pressure;
a bypass valve to control an amount of the portion of the exhaust gases passing through the bypass conduit to the second turbocharger,
the bypass valve being controlled based on a maximum capacity of the first turbocharger;
an accumulator in fluid communication with the second turbocharger and configured to store air received from the second turbocharger at the first pressure;
an auxiliary compressor fluidly coupled to the accumulator, and configured to compress air received from the accumulator to a second pressure; and
an air reservoir configured to store the air received from the auxiliary compressor at the second pressure.

14. The locomotive of claim 13, wherein the second pressure is higher than the first pressure.

15. The locomotive of claim 13, wherein the bypass valve is controlled further based on one or more engine parameters.

16. The locomotive of claim 13, wherein the bypass valve is controlled further based on a pressure of air inside the accumulator.

17. The locomotive of claim 13, further including:
a brake system configured to receive air from the air reservoir to reduce a speed of the locomotive.

18. The energy recovery system of claim 1, further including:
an outlet conduit coupled to the bypass conduit; and
a valve disposed in the outlet conduit,
the valve being operated to allow another portion of the exhaust gases from the bypass conduit to the ambient via the outlet conduit.

19. The engine system of claim 7, further including:
an outlet conduit coupled to the bypass conduit; and
a valve disposed in the outlet conduit,
the valve being controlled to allow another portion of the exhaust gases flowing into the bypass conduit to bypass the second turbocharger and flow through the outlet conduit.

20. The locomotive of claim 13, further including:
an outlet conduit coupled to the bypass conduit; and
a valve disposed in the outlet conduit.

* * * * *